United States Patent

Kaufman

[15] 3,704,374

[45] Nov. 28, 1972

[54] AMBIENT LIGHT VARIATION DETECTOR

[72] Inventor: Theodore Phillip Kaufman, Dallas, Tex.

[73] Assignee: Control Technology, Inc., Garland, Tex.

[22] Filed: Dec. 23, 1970

[21] Appl. No.: 100,923

[52] U.S. Cl. ....................250/206, 307/311, 250/214

[51] Int. Cl. ....................G01j 1/32

[58] Field of Search .......307/311; 328/2, 6; 250/205, 250/206, 214

[56] References Cited

UNITED STATES PATENTS

| | | | |
|---|---|---|---|
| 3,400,270 | 9/1968 | Durig | 250/214 X |
| 3,321,630 | 5/1967 | Durig et al. | 250/214 X |
| 3,334,308 | 8/1967 | Murphy et al. | 328/2 X |
| 3,393,319 | 7/1968 | Randall et al. | 250/206 X |

*Primary Examiner*—Stanley D. Miller, Jr.
*Assistant Examiner*—B. P. Davis
*Attorney*—George W. Hager, Jr.

[57] ABSTRACT

Disclosed is a method and apparatus for supplying a control signal in response to an abrupt change in ambient light level and for maintaining such control signal for a controlled time period irrespective of subsequent light level changes during such controlled time period, such apparatus including a photo-resistor coupled by an input transistor amplifier stage to the trigger input of a silicon controlled rectifier. The silicon controlled rectifier is coupled to an output transistor amplifier stage which provides such control signal.

5 Claims, 2 Drawing Figures

AMBIENT LIGHT VARIATION DETECTOR

BACKGROUND OF THE INVENTION

Figure 1:
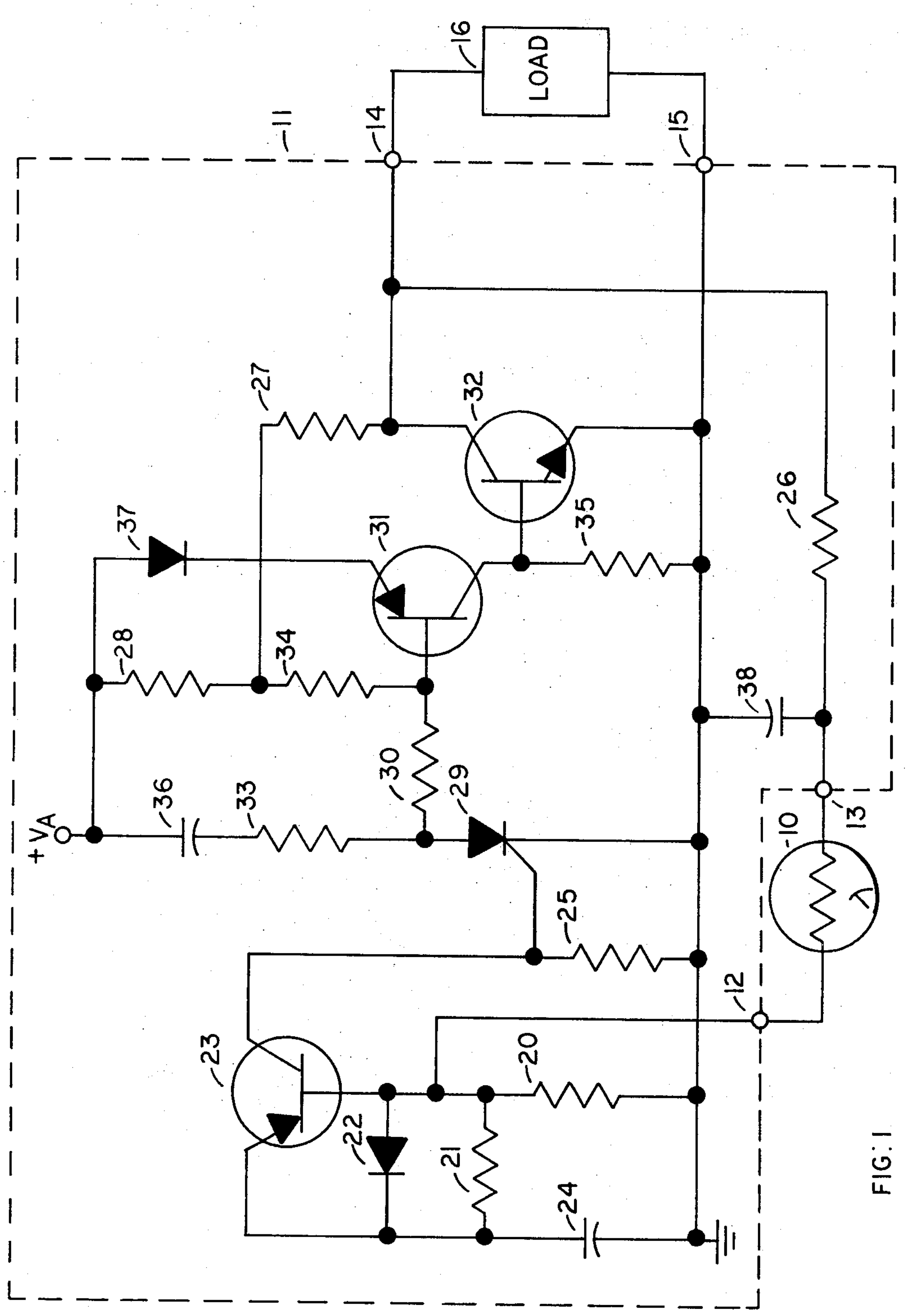

The present invention relates to a method and apparatus for providing a control signal in response to variation in ambient light level, and more particularly to a method and apparatus for detecting an abrupt change in ambient light level and providing a control signal for a predetermined control period in response to such abrupt light level change, such method and apparatus being non-responsive to light level changes occurring during the control period.

There are many devices utilized in the electronics industry today which sense the absolute level of light and initiate some control as a function of the light level exceeding or falling below some predetermined level. Other devices provide some type of control as a result of the absolute light level after having been manually triggered. Although such devices have served the purpose, they have not proved to be entirely satisfactory under all conditions of service for the reason that they are not capable of discriminating between rates of change of absolute light level.

It is therefore a primary object to provide a new and improved method and apparatus for sensing variations in ambient light level.

It is another object to provide a new and improved method and apparatus for providing a control signal when the rate of change of ambient light level exceeds a threshold level.

It is a further object of the present invention to provide a new and improved method and apparatus for providing a control signal for a predetermined control period in response to the detection of the rate of change of ambient light level exceeding a threshold level and for maintaining said control signal independent of further light level changes during such control period.

In accordance with these and other objects, the present invention is directed to an ambient light variation detector having a first circuit portion which detects abrupt ambient light changes and provides a trigger signal to a second circuit portion which produces an output control signal for a fixed time period, such control signal deactivating the first circuit portion from providing any further trigger signals in response to subsequent abrupt light level changes occuring during the fixed control period. Specifically, the ambient light variation detector consists of a photo-resistor coupled to an input amplifier stage to provide an output trigger signal for firing a silicon controlled rectifier in response to a rate of change of photo-resistor resistance being above a predetermined minimum level, and an output amplifier stage which is responsive to the firing of the silicon controlled rectifier for producing an output control signal for a fixed control period, such control signal providing a bias voltage to the photo-resistor sufficient to render the photo-resistor inoperative, thereby preventing the input amplifier stage from providing trigger signals to the silicon controlled rectifier during the control period.

Such an ambient light variation detector as embodies the present invention can be of wide use. For example, it is common practice today to activate various load elements, such as motors, relays, lamps, valves etc., in response to a variation in absolute ambient light level.

Since the response of the improved design of the detector herein is dependent solely upon the rate of change of ambient light level, substantial advantages are achieved by incorporation of this detector in the control of many types of load elements.

Figure 2:
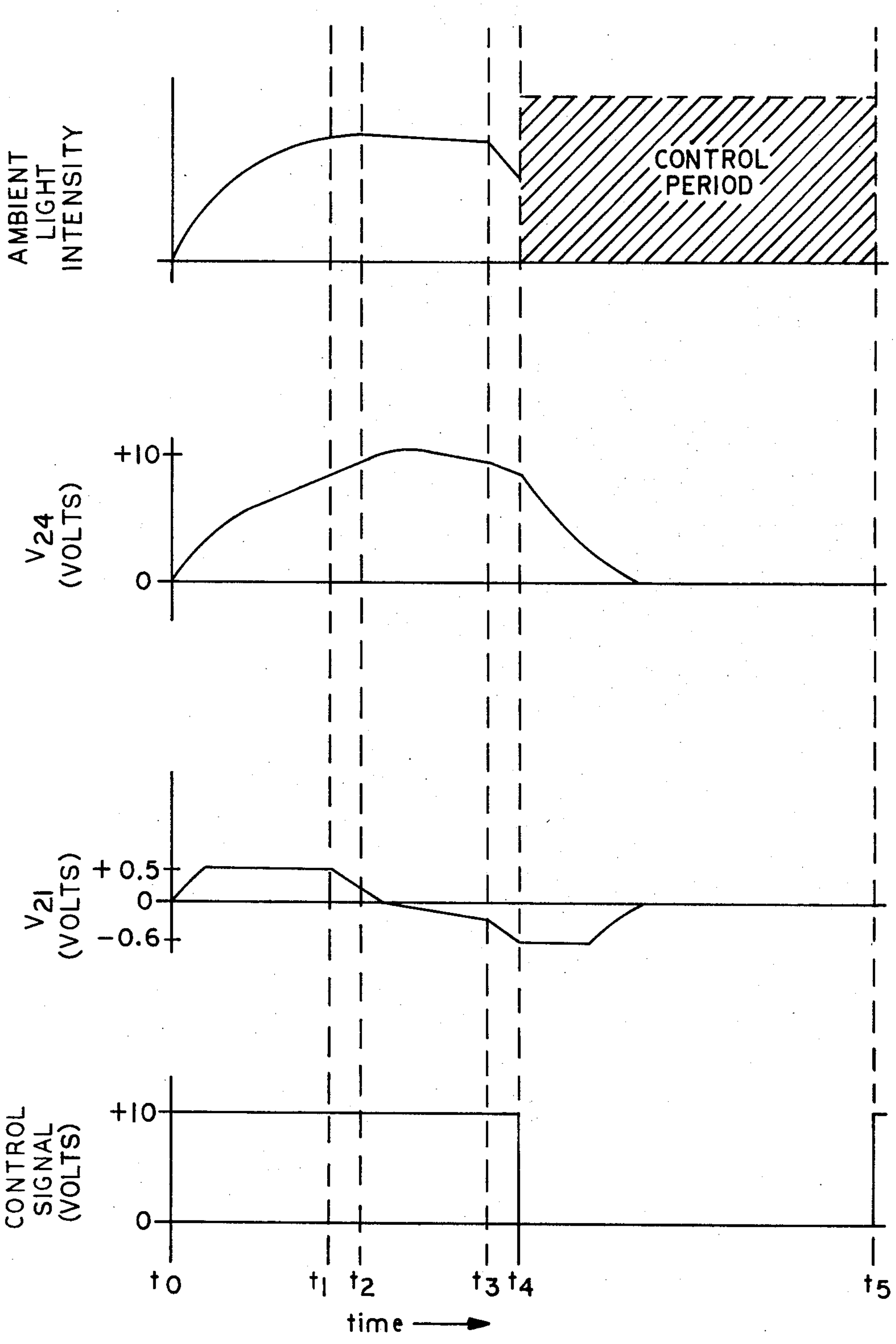

For a more complete understanding of the invention, and for further objects, advantages and features thereof, reference may now be made to the following detailed description taken in conjunction with the accompanying drawings, in which:

FIG. 1 is the circuit schematic of the ambient light variation detector embodying the present invention; and FIG. 2 illustrates, in time relationship, graphs of various signals resulting from the operation of the circuit of FIG. 1.

Referring now to FIG. 1, there is shown a photo-resistor 10 which is exposed to ambient light. Variation in ambient light intensity will cause photo-resistor 10 to vary in resistance. Photo-resistor 10 is coupled to detector 11 through input terminals 12 and 13. Detector 11 is responsive to the rate of change of the resistance of photo-resistor 10 and produces a control signal at output terminals 14 and 15 whenever the rate of change of such resistance is of a predetermined minimum level. Output terminals 14 and 15 are coupled to a load element 16, which might consist of a control alarm, light, motor, valve or other suitable element. The detector control signal, while being indicative of when a minimum rate of change of ambient light intensity occurs, is nevertheless independent of the relative magnitude of such ambient light intensity.

Accordingly, photo-resistor 10 is coupled by way of input terminal 12 to resistors 20 and 21, to the anode terminal of diode 22, and to the base of transistor 23. Resistor 20 is also coupled directly to ground while resistor 21, the cathode terminal of diode 22, and the emitter of transistor 23 are coupled by way of capacitor 24 to ground. The collector of transistor 23 is coupled to ground through resistor 25. Photo-resistor 10 is further coupled by way of input terminal 13 to resistor 26 and capacitor 38.

Detector 11 is biased in conventional manner by positive voltage illustrated as $V_A$, for example, in FIG. 1 as +20 volts. Bias control for transistor 23 is provided by voltage source $V_A$ through photo-resistor 10 in conjunction with resistors 20, 26, 27 and 28.

Transistor 23 has its collector terminal coupled to the trigger input of silicon control rectifier 29. Rectifier 29 is coupled by way of resistor 30 to transistor 31. Transistor 31 is coupled by way of transistor 32 to the detector output terminals 14 and 15. Bias control for silicon control rectifier 29 and transistors 31 and 32 is supplied by voltage source $V_A$ through resistors 27, 28, 30, 33, 34 and 35, capacitor 36 and diode 37.

Referring now to FIGS. 1 and 2, the operation of the photo resistor 10 and the detector 11 is described. Photo-resistor 10 is exposed to ambient light. Any increase or decrease in ambient light intensity will cause photo-resistor 10 to decrease or increase in resistance respectively.

Accordingly, changes in the ambient light intensity can be monitored by the detection of a resistance change in photo-resistor 10. It is a specific feature of the present invention, however, to provide an ambient light variation detector, which produces an output control signal in response to an abrupt change in light level, yet which is non-responsive to absolute light levels of gradual changes in light levels. Accordingly, detector 11 provides an output control signal of a first state so long as there is a steady ambient light intensity illuminating photo-resistor 10 or so long as the rate of change of light intensity is below a required threshold level. When the light intensity illuminating photo-resistor 10 changes at a rate in excess of the required threshold level, the corresponding change in resistance of photo-resistor 10 triggers the detector 11 to produce an output control signal of a second state.

It is further a specific feature of the detector 11 to provide an output control signal of the second state for a predetermined control time period. During this control period the detector 11 is non-responsive to either the absolute level of light or to any change in the level of light, either gradual or abrupt. At the end of the predetermined control period, the detector output control signal is switched back to the first level and the detector 11 is again in a condition to respond to further abrupt variations in the light level.

The specific circuit embodiment of FIG. 1 is specifically designed to monitor and detect ambient light intensity reductions. However, the principle illustrated herein for sensing variations in ambient light intensity is equally applicable for sensing ambient light intensity increases. Accordingly, photo-resistor 10 is exposed to ambient light. Solely for purposes of illustration, a typical waveform of ambient light intensity is represented in FIG. 2 as increasing from zero to some peak level at time $t_2$. An increase in light intensity will cause photo-resistor 10 to decrease in resistance. Photo-resistor 10 in conjunction with resistors 20, 26, 27 and 28 forms a voltage divider across the voltage source $V_A$. As the light intensity increases, thereby decreasing the resistance of photo-resistor 10, the current in such voltage divider increases. Such current increase in the divider increases the voltage across resistor 20. Capacitor 24 charges through diode 22 and follows the voltage increase across resistor 20. FIG. 2 illustrates the voltage developed across capacitor 24, $V_{24}$, as a result of the change in light intensity. Voltage across capacitor 24 increases to some peak level of, for example, 20 volts at some finite time after $t_2$.

As previously noted, charging current for capacitor 24 is supplied by way of resistor 21 and diode 22. The voltage across resistor 21 is limited during rapid charging of capacitor 24 by the forward voltage drop of diode 22. FIG. 2 illustrates the voltage across resistor 21, $V_{21}$, as increasing to a maximum value of, for example, +0.5 volts (the forward voltage drop across diode 22).

During the time interval $t_1 - t_2$, the rate of change of light intensity begins to decrease, thereby causing an appropriate decrease in voltage across resistor 20. During this period the charging current through resistor 21 no longer produces sufficient voltage to cause diode 22 to conduct and the voltage across resistor 21 begins to decrease from the +0.5 volt maximum level.

During the time interval $t_2 - t_3$, light intensity decreases, thereby further decreasing the voltage across resistor 20. Capacitor 24 discharges through resistor 21. Prior to time $t_3$, the discharge voltage developed across resistor 21 is insufficient to cause transistor 17 to be biased into conduction.

During the time interval $t_3 - t_4$, the light intensity decreases at a much more rapid rate and produces a voltage variation across resistor 20 of, for example, 1 volt per second. As a result thereof the discharge voltage across resistor 21 increases until it reaches the inherent emitter base potential (0.6 volts) of transistor 23, at which time transistor 23 is biased into conduction and provides an additional discharge path through resistor 25 for the discharge of capacitor 24.

Conduction of transistor 23 in excess of, for example, 100 microamperes, will produce sufficient voltage across resistor 25 to exceed the inherent "firing potential" of silicon control rectifier 29 of approximately 1 volt. Once rectifier 29 is fired, it will remain in a conduction state so long as the anode current is maintained at a level above the inherent "holding current" of approximately 2 milliamperes. Capacitor 36 rapidly charges to approximately the full value of the voltage source $V_A$of 20 volts through rectifier 29 and resistor 33. A discharge path is provided for capacitor 36 by way of resistor 30 and transistor 31. The base current supplied to transistor 31 by the discharge of capacitor 36 drives transistor 31 into a state of maximum conduction. Transistor 31 then supplies sufficient base current to drive transistor 32 into a state of saturation. Upon saturation, the collector voltage is driven to the emitter voltage of ground potential.

As previously noted, the output control signal of transistor 32 is coupled through detector output terminals 14 and 15 to a load element 16, such signal being illustrated in FIG. 2. During time period $t_1 - t_4$, the rate of change of ambient light intensity is of insufficient magnitude to trigger detector 11 and the output control signal across terminals 14 and 15 is at a first level established by the voltage divider consisting of photo-resistor 10, and resistors 20, 26, 27 and 28, that is, approximately 10 volts. Upon the triggering of detector 11 and the saturation of transistor 32 at time $t_4$, the output control signal is driven to a second level of zero volts and remains at zero volts during the entire control period $t_4 - t_5$. Simultaneously, the voltage applied to photo-resistor 10 is zero volts, thereby disabling detector 11 from detecting any further light intensity variations during the control period.

The duration of the control period $t_4 - t_5$ is determined by capacitor 36, resistor 30 and the current gain of transistors 31 and 32. The saturation of transistor 32 increases the current through resistors 27 and 28. The increase in voltage across resistor 28 is coupled through resistor 34 to the base of transistor 31, thereby establishing positive feedback between the output of transistor 32 and the input of transistor 31. Resistors 27, 28 and 34 are selected such that the input current to transistor 31 through feedback resistor 34 is insufficient, by itself, to maintain transistor 32 in a state of saturation. As previously discussed, however, transistor 31 is driven into conduction by the discharge current of capacitor 36. When the voltage on capacitor 36 has discharged to a level of approximately 4 volts, the combination of feedback current and discharge current is no longer sufficient to maintain transistor 31 in a saturation state, and the collector voltage of transistor 32 will start to increase from ground potential. This reduces the feedback current input contribution to transistor 31 to such an extent that the combination of feedback current and discharge current no longer maintains transistors 31 and 32 in conduction.

Resistor 26 and capacitor 38 provide a delay between the time the control period ends and the time that sufficient voltage is developed across capacitor 36 to again permit operation of photo-resistor 10 and detector 11. The delay is, for example, 0.1 second and is sufficient to prevent the detector from being triggered when it is used to provide an output control signal to control lighting to which photo-resistor 10 may be exposed. Following this time delay, capacitor 24 is charged to a voltage level representing the ambient light intensity at that time. The detector is thus adjusted to the existing light level and is in a condition to be triggered by the next light level change in excess of the predetermined minimum rate of change.

The photo-resistor 10 and detector 11 of the present invention are particularly suitable for controlling a variety of load elements, for example, motors, valves, lights or other apparatus, in response to a predetermined rate of change of ambient light level, and for maintaining such control of such load elements for a predetermined control period independent of changes in the ambient light level occurring during such control period.

Various types and values of circuit components may be utilized in detector 11 to effect the previously described operation. In accordance with one specific example, however, the following circuit arrangement was utilized in conjunction with a photo-resistor having a maximum resistance of approximately 100 kilohms under minimal illumination conditions and a minimum resistance of approximately 3 kilohms under maximum illumination conditions:

| | |
|---|---|
| Photo-resistor **10** | Moriria (Yokohoma, Japan) MKY-5C38 |
| Resistors **20** and **21** | 47 K ohms |
| Resistor **25** | 10 K ohms |
| Resistors **26** and **35** | 12 K ohms |
| Resistor **27** | 22 K ohms |
| Resistors **28** and **33** | 1 K ohm |
| Resistors **30** and **34** | 330 K ohms |
| Capacitors **24** and **38** | 15 μf |
| Capacitor **36** | 100 μf |
| Diodes **22** and **37** | 1N914 |
| Transistors **23** and **31** | 2N5226 |
| Transistor **32** | 2N3858 |
| Silicon Control Rectifier **29** | 2N5060 |

Various modifications to the disclosed embodiment, as well as alternate embodiments, may become apparent to one skilled in the art without departing from the scope and spirit of the invention as defined by the appended claims.

What is claimed is:

1. An ambient light intensity variation detector comprising:
   a. first means responsive to the variation in ambient light intensity for generating a trigger pulse when the variation in ambient light intensity with respect to time exceeds a predetermined rate, and
   b. second means responsive to said trigger pulse for producing a control signal, said second means further including means for sustaining said control signal for a predetermined control period independent of the ambient light intensity during said control period.

2. The detector as set forth in claim 1 further including third means for providing a bias voltage to said first means sufficient to cause operation of said first means, said first means being responsive to said control signal to reduce the bias voltage supplied to said first means below the level necessary for operation of said first means, thereby disabling said first means from detecting ambient light intensity variations occurring during said control period.

3. The detector set forth in claim 2 wherein said first means is a first amplifier with input coupled to a light sensitive photo-resistor, and said second means is a second amplifier with input coupled to the output of said first amplifier whereby said second amplifier provides a control signal when said first amplifier is activated by a resistance variation with respect to time in said photo-resistor of a predetermined rate in response to variation in the ambient light intensity.

4. Apparatus for providing a control signal in response to variation in ambient light intensity, said control signal occurring as a result of a variation in said light intensity with respect to time in excess of a predetermined rate and being sustained for a predetermined control period, said apparatus comprising:
   a. a photo-resistor, subjected to ambient light, for providing a resistance variation proportional to the variation of said light intensity with respect to time;
   b. a first amplifier stage coupled to said photo-resistor for providing a trigger pulse when the variation in resistance of said photo-resistor with respect to time exceeds a predetermined rate;
   c. a second transistor amplifier stage with input coupled to the output of said first amplifier stage for providing a control signal when there is a presence of a trigger pulse at its input;
   d. a capacitor means coupling a bias voltage supply to said second transistor amplifier stage;
   e. feedback resistor means coupling the output of said second amplifier stage to its input, said feedback resistor means in combination with said capacitor means controlling the duration of said control signal; and
   f. means for applying said control signal to said photo-resistor to render said photo-resistor inoperative thereby preventing said first amplifier stage from providing trigger pulses to said second amplifier stage during said control period.

5. An ambient light intensity detector comprising:
   a. a first transistor amplifier;
   b. bias control means coupled to the input of said first transistor amplifier;
   c. a photo-resistor coupled to said bias control means whereby a variation in resistance of said photo-resistor with respect to time in excess of a threshold amount will cause said bias control means to provide a bias voltage to said first transistor amplifier sufficient to cause operation of said first transistor amplifier;
   d. a second transistor amplifier stage coupled at its input to said first transistor amplifier for providing a control signal in response to the operation of said first transistor amplifier;
   e. capacitor means coupling a bias supply voltage to said second transistor amplifier stage;

f. feedback resistor means coupling the output of said second transistor amplifier stage to its input, said feedback resistor means in combination with said capacitor means providing the control for the duration of said control signal; and g. means coupling the output of said second transistor amplifier stage to said bias control means to reduce the bias voltage supplied to said first transistor amplifier below the level necessary for operation of said amplifier during the presence of said control signal.

* * * * *